April 5, 1966   W. N. KERNANDER ETAL   3,245,021
SHUNT FOR ELECTRICAL INSTRUMENTS
Original Filed Dec. 27, 1962
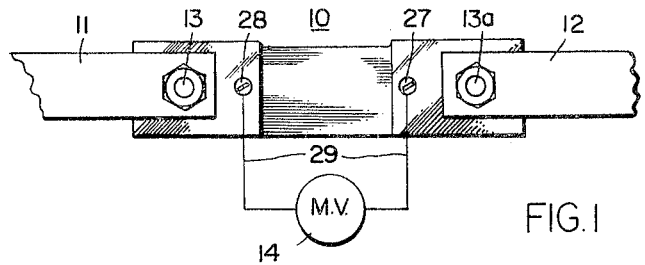
FIG. 1
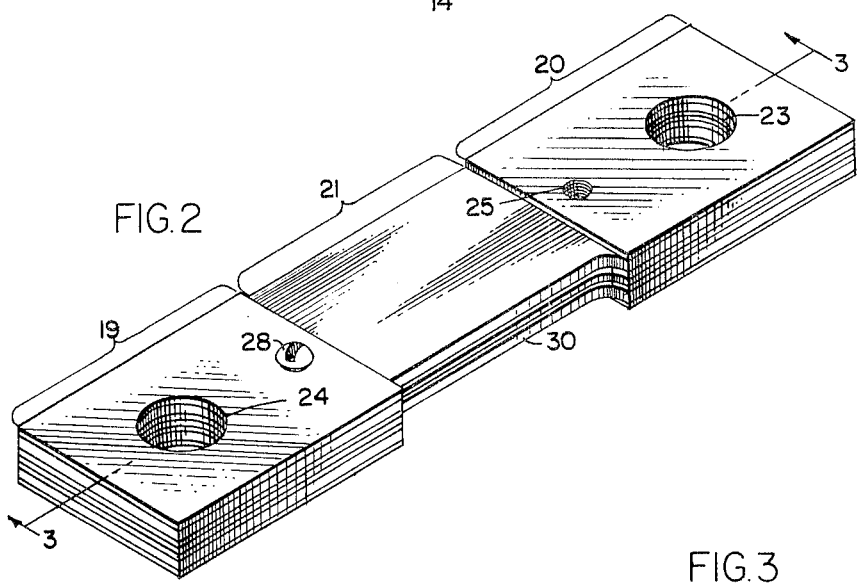
FIG. 2
FIG. 3
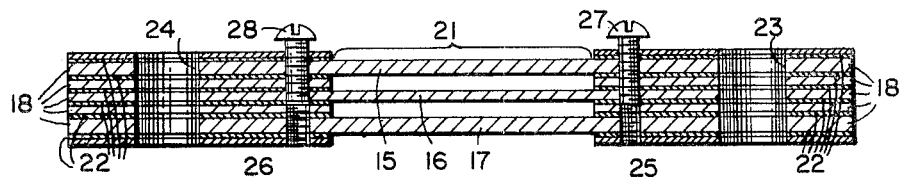
FIG. 4
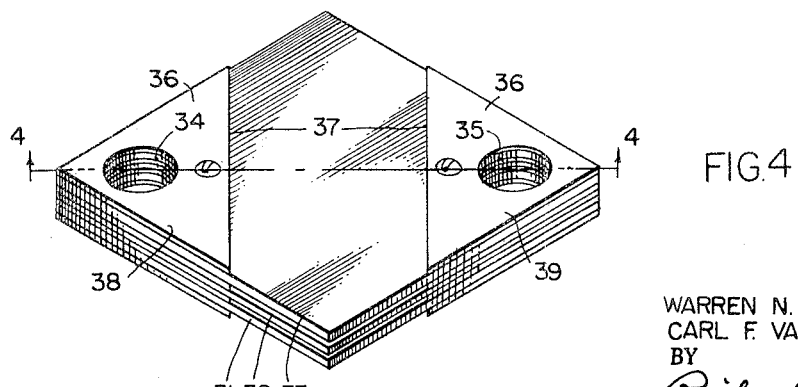
INVENTORS
WARREN N. KERNANDER
CARL F. VAN BENNEKOM
BY
Richard E. Hosley
THEIR ATTORNEY 3,245,021
SHUNT FOR ELECTRICAL INSTRUMENTS
Warren N. Kernander, Boxford, and Carl F. Van Bennekom, Lynnfield, Mass., assignors to General Electric Company, a corporation of New York
Original application Dec. 27, 1962, Ser. No. 247,750. Divided and this application July 29, 1964, Ser. No. 385,876
1 Claim. (Cl. 338—49)

The present invention relates to shunts for electrical instruments and a method for making the same.

The subject application is a division of application Serial No. 247,750 filed December 27, 1962.

Shunts are used in connection with electrical instruments for measuring the flow of electrical current in circuits, particularly circuits carrying heavy current. The shunt carries most of the current to be measured through a resistance calibrated in relation to the instrument with which it is used so that there is a predetermined relationship between the current through the shunt and the voltage drop across the shunt. The electrical measuring instrument is usually a sensitive millivoltmeter connected across the shunt to measure this voltage drop, the instrument itself carrying only a small fraction of the total current being measured, most of which bypasses the instrument and flows through the shunt.

Most shunts currently in use comprise two massive solid terminal blocks usually formed of copper or brass castings or extrusions. Extending between the terminal blocks are a plurality of spaced strips of conducting material the ends of which are soldered or welded in slots machined in the opposing faces of the terminal blocks. These shunts are costly to build because relatively skilled labor is required to machine the slots in the terminal blocks accurately and because scrap losses are high due to the large amount of metal in any terminal blocks that must be scrapped because of machining error. Furthermore, assembly is difficult because of the weight of the massive terminal blocks which makes them difficult to handle.

Accordingly, it is an object of the present invention to provide a shunt which is simple in construction, formed of relatively lightweight component parts, and hence is less costly and easier to manufacture.

Further objects and advantages of the invention will become apparent as the following description proceeds.

Briefly, in accordance with an illustrated embodiment of the invention, a shunt is constructed by assembling in stacked relation in a suitable fixture one or more conductor strips, a plurality of terminal plates and a plurality of strips of fusible metal having a melting point below that of the conductor strips and terminal plates. The assembly arrangement is such that a terminal plate is disposed adjacent the end portions of each conductor strip so as to hold the conductor strips in spaced relations. A strip of fusible metal is disposed between each terminal plate and the adjacent conductor strip thereby forming laminated terminal block sections on each end of the conductor strip or strips. The assembly is then clamped together and subjected to sufficient heat to melt the fusible strips which integrally unite the assembly upon subsequent cooling. Holes are then drilled through each terminal block section to receive bolts which fasten the shunt to the busbar conductors and also act to hold together the entire assembly.

For a better understanding of the invention, reference should be made to the following detailed description taken in connection with the accompanying drawing in which:

FIGURE 1 illustrates the manner in which a shunt constructed in accordance with the present invention is connected to current-carrying conductors and to an associated electrical measuring instrument used to measure the flow of current through the conductors;

FIGURE 2 is a perspective view of the shunt showing certain constructional details;

FIGURE 3 is a cross-sectional view of the shunt of FIGURE 2 taken along the section line 3—3 looking in the direction of the arrows; and FIGURE 4 illustrates a modified form of the invention wherein the conductor strips have an enlarged lateral dimension between the terminal block sections to facilitate dissipation of heat from the shunt.

Referring now to the drawing, there is illustrated in FIGURE 1 a typical installation of a shunt indicated generally by the numeral 10 connected between two conductors or busbars 11 and 12 by means of bolts 13 and 13a. It will be understood that the busbars 11 and 12 form a part of an electrical circuit in which the flow of current is to be measured. Connected across the shunt 10 is a sensitive electrical measuring instrument in the form of a conventional millivoltmeter 14 which responds to the voltage drop across the shunt and thereby provides an indication of current flow in the electrical circuit comprising the busbars 11 and 12.

FIGURES 2 and 3 of the drawing show details of the shunt 10 constructed in accordance with one embodiment of the invention. In the form illustrated, the shunt comprises a plurality of rectangular conductor strips 15, 16, and 17 extending lengthwise of the shunt. Disposed adjacent and between end portions of the conductor strips 15, 16, and 17 are a plurality of juxtaposed terminal plates 18 which act to support the conductor strips in parallel spaced relation. The terminal plates also form with the conductor strips laminated terminal block sections 19 and 20 on the ends of the conductor strips with intermediate spaced portions 21 of the conductor strips extending between the terminal block sections.

The conductor strips 15, 16, and 17 are preferably formed of a suitable electrically conducting material the resistance of which remains relatively constant within normal operating limits with changes in temperature so that the calibration of the shunt will not change appreciably with temperature changes. One such material which is satisfactory for this purpose, known as "manganin," is a copper alloy comprising 84.55% copper, 13.20% manganese, 1.92% nickel, 0.25% iron, and 0.08% silicon.

The terminal plates 18 are preferably formed of low-cost electrically conducting material having low resistance, such as copper.

After assembly, the laminated terminal block sections 19 and 20 are bonded to form an integrally united assembly and to obtain a stable and low-resistance electrical conducting path between the terminal plates and the conductor strips. In the illustrated shunt the bonding is accomplished by inserting during the assembly operation strips 22 of fusible material such as solder between the terminal plates 18 and the end portions of the conductor strips 15, 16, and 17. The solder is selected to have a melting point below that of the conductor strips and the terminal plates. A common form of solder comprising 50% tin and 50% lead has been found to be satisfactory. After the assembly is stacked, it is clamped together and heated sufficiently to melt the solder which integrally unites the assembly. This melting of the solder may be accomplished conveniently by immersing the assembly in a bath of hot oil or liquid salt. Instead of using solder as in the preferred illustrated embodiment of the invention, the conductor strips may be bonded in other ways as, for example, by a welding operation to fuse the terminal plates to the ends of the conductor strips and establish a stable and low-resistance electrical contact therebetween.

After the assembly is bonded, holes 23 and 24 are drilled through the terminal block sections 19 and 20. These holes are dimensioned to receive suitable fastening bolts 13 and 14 which secure the shunt to the busbars 11 and 12 and also apply a compression force holding the laminated shunt in the assembled position thereby further strengthening the shunt during its use under operating conditions. Two additional holes 25 and 26 are drilled in the terminal block sections and tapped to receive threaded screws 27 and 28 which act as terminals for securing leads 29 from the measuring instrument 14.

It will be understood that the current capacity of the shunt may be conveniently changed by varying the number of conductor strips used in the stacked assembly. Also, the dimensions of the strip may be varied. Thus, it will be noted in FIGURE 3 of the drawing that the center strip 16 is shown thinner than the two outer strips 15 and 17 for the purposes of illustration. Thus, shunts of varying capacities may be easily constructed from a relatively small number of standardized parts.

It will also be understood that after the shunt is assembled and bonded, the resistance of the shunt as measured between the terminals 27 and 28 may be conveniently calibrated to the desired value in relation to the characteristics of the measuring instrument 14 by removal of a part of the intermediate portion 21 of the conductor strips as by grinding or filing. Thus, it will be noted in FIGURE 2 that a portion of the conductor strip material has been removed on one side identified by the numeral 30.

A shunt constructed in accordance with the invention has, in addition to flexibility in design, the further advantage that each component part is small in size and relatively light in weight. For that reason handling the parts is greatly facilitated during assembly. Furthermore, the terminal plates and the conductor strips may be easily cut or sheared from sheet material with simple equipment requiring relatively unskilled labor. Also, the sheet material used is less costly than the heavy castings and extrusions used in prior art constructions.

In FIGURE 4 of the drawing, there is shown a modification of the invention wherein the conductor strips 31, 32, and 33 are diamond shaped in order to provide an enlarged lateral dimension transverse to an axis 4—4 passing through bolt holes 34 and 35. Terminal plates 36 are triangular in shape in order to be congruent with the edges of the conductor strip. Because of the larger radiating surface of the center section, heat is radiated more efficiently from the terminal sections 38 and 39. This enables the shunt to operate at lower temperatures; or, expressed in another way, for a given operating temperature limit, a smaller amount of material may be used in the shunt. Obviously, other configurations of the conductor strips providing enlarged lateral dimensions in the intermediate portions may be used without departing from the invention.

While there have been described what are at present considered to be the preferred embodiments of the invention, it will be apparent to those skilled in the art that various changes and modifications may be made therein without departing from the spirit or scope of the invention.

What we claim as new and desire to secure by Letters Patent of the United States is:

A shunt comprising a plurality of conductor strips having a diamond shape, a plurality of terminal plates formed of conducting material disposed between diagonally opposite end portions of the conductor strips to support the intermediate portions of the conductor strips in parallel spaced relation, said terminal plates being triangular in shape and arranged to be congruent with the edges of the conductor strips, the conductor strips and terminal plates being bonded to form an integral assembly comprising laminated terminal block sections and means for fastening electrical conductors to the terminal block sections.

References Cited by the Examiner

UNITED STATES PATENTS

| | | | |
|---|---|---|---|
| 779,737 | 1/1905 | Robinson | 338—49 |
| 859,255 | 7/1907 | Roller | 338—49 |
| 1,050,563 | 1/1913 | Roller | 338—49 |
| 2,736,785 | 2/1956 | DuBois | 338—288 |
| 3,050,612 | 8/1962 | Eversole | 219—233 |

FOREIGN PATENTS

| | | |
|---|---|---|
| 19,993 | 6/1905 | Great Britain. |

RICHARD M. WOOD, *Primary Examiner.*

W. D. BROOKS, *Assistant Examiner.*